United States Patent [19]

Nagai et al.

[11] Patent Number: 5,431,720
[45] Date of Patent: Jul. 11, 1995

[54] AQUEOUS INK COMPOSITION AND INK-JET PRINTING METHOD USING THE SAME

[75] Inventors: Kiyofumi Nagai, Tokyo; Kakuji Murakami, Kawasaki, both of Japan

[73] Assignee: Ricoh Company, Ltd., Tokyo, Japan

[21] Appl. No.: 130,462

[22] Filed: Oct. 1, 1993

[30] Foreign Application Priority Data

Oct. 1, 1992 [JP] Japan .................. 4-263550

[51] Int. Cl.$^6$ .............................................. C09D 11/02
[52] U.S. Cl. .................. 106/20 R; 106/22 R; 106/22 H; 106/20 D
[58] Field of Search ............... 106/20 R, 22 R, 22 H, 106/20 D

[56] References Cited

U.S. PATENT DOCUMENTS

| | | | |
|---|---|---|---|
| 4,427,810 | 1/1984 | Chisvette et al. | 106/20 C |
| 4,508,570 | 4/1985 | Fujii et al. | 106/20 D |
| 4,732,616 | 3/1988 | Kondo et al. | 106/20 R |
| 4,793,860 | 12/1988 | Murakami et al. | 106/22 K |
| 4,908,063 | 3/1990 | Baker et al. | 106/31 R |
| 4,923,515 | 5/1990 | Koike et al. | 106/20 D |
| 4,985,077 | 1/1991 | Ise et al. | 106/22 R |
| 5,019,166 | 5/1991 | Schwarz | 106/20 D |
| 5,124,718 | 6/1992 | Koike et al. | 106/20 D |

*Primary Examiner*—Helene Klemanski
*Attorney, Agent, or Firm*—Oblon, Spivak, McClelland, Maier & Neustadt

[57] ABSTRACT

ASn aqueous ink composition composed of water, a lubricant, a coloring agent dispersed or dissolved in water, and a compound of formula (I):

$$R-O(CH_2CH_2O)_mCH_2COOM \qquad (I)$$

wherein R is an alkyl group having 6 to 14 carbon atoms which may be branched; M is a cation selected from the consisting of alkali metal ion, quaternary ammonium cation, quaternary phosphonium cation, and alkanol amine cation; and m is an integer of 3 to 12. Further, an ink-jet printing method of recording color images is disclosed, which includes the step of ejecting the above-mentioned aqueous ink composition from nozzles onto an image-receiving medium with a Stöckigt sizing degree of 3 seconds or more as defined in the JIS-P-8122.

18 Claims, 1 Drawing Sheet

AQUEOUS INK COMPOSITION AND INK-JET PRINTING METHOD USING THE SAME

BACKGROUND OF THE INVENTION

1. Field of the Invention

The present invention relates to an aqueous ink composition suitable for an ink-jet printer, aqueous writing utensils, various kinds of recorders and pen plotters, and more particularly to an aqueous ink composition capable of producing color images on a sheet of plain paper by the ink-jet printing method. In addition, the present invention relates to an ink-jet printing method for recording color images on a sheet of plain paper using the above-mentioned aqueous ink composition.

2. Discussion of Background

The ink-jet printer has been widely utilized recent years because of its advantages of low noise and low running cost, and a color ink-jet printer capable of producing color images on a sheet of plain paper has been on the market. With respect to the conventional ink-jet printers, however, all the requirements for the obtained color images, such as color reproduction, water-resistance, light-resistance, drying characteristics and image quality without blurring, and the reliability of ink-ejection from the printer cannot be satisfied. Particularly, when the color images are produced by using the color ink-jet printer, the deterioration in image quality takes place in an image portion of a secondary color such as red, green or blue obtained by superimposing the colored inks, even though the image quality of color images of yellow, magenta or cyan scarcely deteriorates.

Further, in the case where the ink deposited on a sheet of paper is dried without any specific image-fixing unit, it is necessary to improve the drying characteristics of the ink by increasing the penetrating property of the ink through the paper, as described in Japanese Laid-Open Patent Application 55-29546. Because of the increase in the penetrating property of ink through the paper, obtained images are easily blurred depending upon the kind of paper.

It is described in Japanese Patent Publication 60-23793 that not only the drying characteristics of ink can be improved, but also the deterioration of obtained images can be reduced when dialkylsulfosuccinic acid is used in the ink composition as a surface active agent. When such an ink composition is used for ink-jet printing, however, the diameter of a picture element of the obtained image remarkably varies depending on the kind of image-receiving sheet to be employed, and the decrease in image density of the printed images is conspicuous. In addition to the above, this kind of surface active agent is easily decomposed in an ink composition with a high alkaline strength, so that the activating effect of the surface active agent is impaired during the storage of the ink composition.

A quick-drying ink is disclosed in Japanese Patent Publication 58-6752, which comprises as a surface active agent an ethylene oxide adduct with an acetylene bonding. This quick-drying ink has the advantage that the penetrating property of the ink through a sheet of paper is improved owing to the ethylene oxide adduct contained in the ink composition, thereby reducing the blurring of ink on the paper. However, there is the problem that the drying rate of the ink cannot be increased according to the kind of dye contained in the ink composition. For example, when a direct dye such as DBK168 is used as the dye in the ink composition, the drying rate of the ink cannot be increased because of the hydrophobic interaction between the surface active agent and the dye.

An ink composition comprising a strongly basic material is disclosed in Japanese Laid-Open Patent Application 56-57862. The penetrating speed of this kind of ink composition through a so-called acidic paper, which has been sized by use of rosin, can be increased. However, even when the acidic paper is used, the penetrating speed of the ink through the paper is not increased when an image is obtained by superimposing two colored inks. In addition, the above-mentioned ink composition is not appropriate for the paper prepared by use of a sizing agent such as alkyl ketene dimer or alkenyl sulfosuccinic acid.

There is proposed a recording ink composition comprising a polyhydric alcohol derivative and pectin as disclosed in Japanese Laid-Open Patent Application 1-203483. In this ink composition, pectin is contained as a thickening agent to prevent the blurring of ink on the paper. When the ink composition is used for the ink-jet printer, however, ejection of the ink from the nozzles of the printer is not stable when the printing operation is resumed after intermission because pectin is a nonionic material having a hydroxyl group as a hydrophilic group.

SUMMARY OF THE INVENTION

Accordingly, a first object of the present invention is to provide an aqueous ink composition suitable for the ink-jet printing, with excellent drying characteristics, penetrating property and preservation stability, capable of producing high quality images not deteriorating over a long period of time on an image-receiving medium.

A second object of the present invention is to provide an ink-jet printing method of recording high quality color images on a sheet of plain paper using the above-mentioned aqueous ink composition.

The above-mentioned first object of the present invention can be achieved by, an aqueous ink composition comprising water, a lubricant, a coloring agent dispersed or dissolved in water, and a compound represented by formula (I):

$$R-O(CH_2CH_2O)_mCH_2COOM \qquad (I)$$

wherein R is an alkyl group having 6 to 14 carbon atoms; M is a cation selected from the group consisting of alkali metal ion, quaternary ammonium cation, quaternary phosphonium cation, alkanol amine cation; and m is an integer of 3 to 12.

The second object of the present invention can be achieved by a method of recording color images on an image-receiving medium, comprising the step of ejecting an aqueous ink composition in the form of droplets from nozzles onto an image-receiving medium with a Stöckigt sizing degree of 3 seconds or more as defined in the Japanese Industrial Standards P-8122 (hereinafter referred to as JIS-P-8122), the aqueous ink composition comprising water, a lubricant, a coloring agent dispersed or dissolved in water, and a compound represented by formula (I):

$$R-O(CH_2CH_2O)_mCH_2COOM \qquad (I)$$

wherein R is an alkyl group having 6 to 14 carbon atoms; M is a cation selected from the group consisting of alkali metal ion, quaternary ammonium cation, quaternary phosphonium cation, and alkanol amine cation; and m is an integer of 3 to 12.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
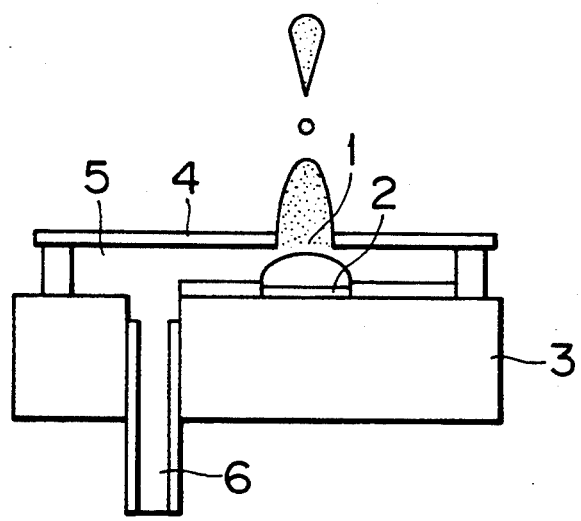
FIG. 1 is a schematic view of one embodiment which shows the structure of a thermal ink-jet printer for use with an aqueous ink composition according to the present invention.

To allow the ink to smoothly penetrate through paper, an aqueous ink composition according to the present invention comprises a compound of formula (I):

R—O(CH$_2$CH$_2$O)$_m$CH$_2$COOM  (I)

wherein R is an alkyl group having 6 to 14 carbon atoms which may be branched; M is a cation selected from the group consisting of alkali metal ion, quaternary ammonium cation, quaternary phosphonium cation, and alkanol amine cation; and m is an integer of 3 to 12. By the addition of the compound of formula (I) to the ink composition, the surface tension of the ink can be decreased to 50 mJ/m$^2$ or less, so that the wettability of the surface of paper by the ink composition can be improved. Consequently, the penetrating speed of the ink through paper can be increased. At the same time, it is confirmed that the deterioration in image quality of the images formed by use of the ink composition according to the present invention can be reduced to a greater extent as compared with the case where an ink composition comprising a conventional surface active agent is employed for image formation. In addition, when the aqueous ink composition according to the present invention is used in the printing operation, the diameter of a picture element does not vary depending upon the kind of paper, for instance, a sheet of coated paper or plain paper for use with an ink-jet printer. Further, the penetrating speed of the ink through paper can be almost the same regardless of the kind of dye contained in the ink composition.

It is found that the solubility of the compound of formula (I) in the aqueous ink composition is improved when M in the aforementioned formula (I) is an alkali metal ion such as sodium cation or lithium cation; quaternary ammonium cation of formula (II-1):

wherein R$^1$, R$^2$, R$^3$ and R$^4$ each is selected from the group consisting of an alkyl group having 1 to 6 carbon atoms, a hydroxyalkyl group having 1 to 6 carbon atoms, and a halogenated alkyl group having 1 to 4 carbon atoms; quaternary phosphonium cation of formula (II-2):

wherein R$^1$, R$^2$, R$^3$ and R$^4$ each is selected from the group consisting of an alkyl group having 1 to 6 carbon atoms, a hydroxyalkyl group having 1 to 6 carbon atoms, and a halogenated alkyl group having 1 to 4 carbon atoms; and alkanol amine cation of formula (II-3):

wherein at most three of R$^1$, R$^2$, R$^3$ or R$^4$ is hydrogen, and the remainder is a hydroxyalkyl group having 1 to 6 carbon atoms.

Alternatively, an aqueous ink composition according to the present invention may comprise water, a lubricant, a coloring agent dispersed or dissolved in water, an anion of formula (I-1):

R—O(CH$_2$CH$_2$O)$_m$CH$_2$COO$^-$  (I-1)

wherein R is an alkyl group having 6 to 14 carbon atoms which may be branched, and m is an integer of 3 to 12; at least one counter cation selected from the group consisting of alkali metal ion, quaternary ammonium cation, quaternary phosphonium cation, and alkanol amine cation; and a compound of formula (I-2):

R—O(CH$_2$CH$_2$O)$_m$CH$_2$COOH  (I-2)

wherein R is an alkyl group having 6 to 14 carbon atoms which may be branched, and m is an integer of 3 to 12, the ink composition having a pH of 6 or more.

Specific examples of the compound of formula (I-2) in the form of a free acid are as follows:

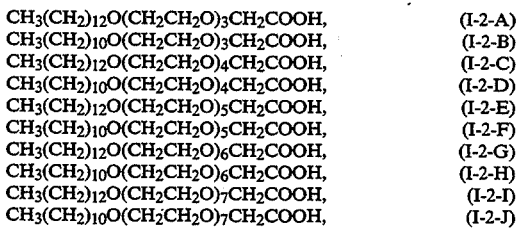

| | |
|---|---|
| CH$_3$(CH$_2$)$_{12}$O(CH$_2$CH$_2$O)$_3$CH$_2$COOH, | (I-2-A) |
| CH$_3$(CH$_2$)$_{10}$O(CH$_2$CH$_2$O)$_3$CH$_2$COOH, | (I-2-B) |
| CH$_3$(CH$_2$)$_{12}$O(CH$_2$CH$_2$O)$_4$CH$_2$COOH, | (I-2-C) |
| CH$_3$(CH$_2$)$_{10}$O(CH$_2$CH$_2$O)$_4$CH$_2$COOH, | (I-2-D) |
| CH$_3$(CH$_2$)$_{12}$O(CH$_2$CH$_2$O)$_5$CH$_2$COOH, | (I-2-E) |
| CH$_3$(CH$_2$)$_{10}$O(CH$_2$CH$_2$O)$_5$CH$_2$COOH, | (I-2-F) |
| CH$_3$(CH$_2$)$_{12}$O(CH$_2$CH$_2$O)$_6$CH$_2$COOH, | (I-2-G) |
| CH$_3$(CH$_2$)$_{10}$O(CH$_2$CH$_2$O)$_6$CH$_2$COOH, | (I-2-H) |
| CH$_3$(CH$_2$)$_{12}$O(CH$_2$CH$_2$O)$_7$CH$_2$COOH, | (I-2-I) |
| CH$_3$(CH$_2$)$_{10}$O(CH$_2$CH$_2$O)$_7$CH$_2$COOH, | (I-2-J) |

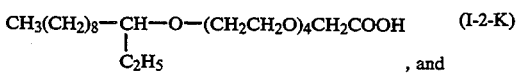

$$CH_3(CH_2)_8-\underset{\underset{C_2H_5}{|}}{CH}-O-(CH_2CH_2O)_4CH_2COOH \quad \text{(I-2-K)}$$

, and

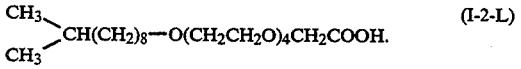

$$\underset{CH_3}{\overset{CH_3}{>}}CH(CH_2)_8-O(CH_2CH_2O)_4CH_2COOH. \quad \text{(I-2-L)}$$

The above compounds can be employed alone or in combination in the aqueous ink composition of the present invention.

Commercially available surface active agents comprising as the main component the compound of formula (I) are available in the aqueous ink composition of the present invention. For example, commercially available surface active agent "ECTD-3NEX" (Trademark), with formula (I) in which R is tridecyl group, M is sodium cation, and m is 3; "ECT3" (Trademark); with formula (I) in which R is tridecyl group, M is hydrogen, and m is 3; and "ECTD-6NEX" (Trademark), with formula (I) in which R is tridecyl group, M is sodium cation, and m is 6, all made by Nikko Chemicals Co., Ltd.

The amount of the compound of formula (I), which depends on the printer system to be used, is preferably in the range of 0.05 to 10 wt. % of the entire weight of the ink composition. When the compound of formula (I) is contained in the ink composition at the above-mentioned concentration, a desired penetrating property can be imparted to the ink composition and sharp images can be obtained without being spread on a sheet of paper at the boundaries of a secondary color image obtained by superimposing the two colored inks. At the same time, the reliability of the ink composition at low temperatures is not decreased, because the compound of formula (I) or a dye contained in the ink composition does not separate out at low temperatures.

For example, when the compound of formula (I) is used in the form of a lithium salt in the ink composition of the present invention, lithium hydroxide may be added to the free-acid type compound of formula (I). When the ink composition of the present invention comprises an anion of formula (I-1) and quaternary ammonium cation of formula (II-1), the following hydroxides (II-1-A) to (II-1-F) may be added to the free-acid type compound of formula (I):

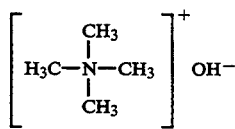 (II-1-A)

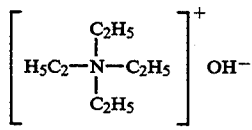 (II-1-B)

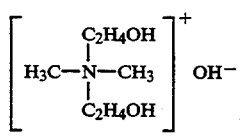 (II-1-C)

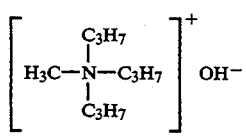 (II-1-D)

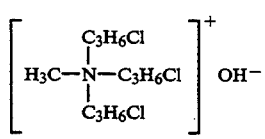 (II-1-E)

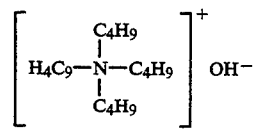 (II-1-F)

When the ink composition of the present invention comprises an anion of formula (I-1) and quaternary phosphonium cation of formula (II-2), the following hydroxides (II-2-A) and (II-2-B) may be added to the free-acid type compound, of formula (I):

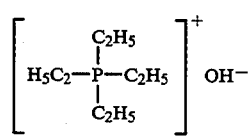 (II-2-A)

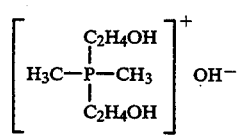 (II-2-B)

When the ink composition of the present invention comprises an anion of formula (I-1) and alkanol amine cation of formula (II-3), the following cation may be employed:

  [triethanol amine cation]

It is preferable that the amount of the anion exist in a molar ratio of 30% or more, more preferably 50% or more, of the number of moles of the compound of formula (I).

In the present invention, it is not necessary that all the counter cations in the compound of formula (I) be composed of sodium cation, lithium cation, and/or quaternary ammonium cation, quaternary phosphonium cation and alkanol amine cation. The above-mentioned counter cations and other alkaline ions may be contained in combination.

The aqueous ink composition of the present invention comprises water as a liquid medium. To impart the desired physical properties to the aqueous ink composition, to prevent the ink composition from drying, and to improve the soluble-stability of the compound of formula (I) in the ink composition, water-soluble organic solvents can be employed in the present invention.

Examples of the water-soluble organic solvents are polyhydric alcohols such as ethylene glycol, diethylene glycol, triethylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, and 3-methylpentane-1,3,5-triol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers derived from polyhydric alcohols such as ethylene glycol monophenyl ether, and ethylene glycol monobenzyl ether; nitrogen-containing heterocyclic compounds such as N-methyl-2pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanol amine, diethanol amine, triethanol amine, monoethyl amine, diethyl amine, and triethyl amine; sulfur-containing compounds such as sulfolane, and thiodiethanol; propylene carbonate; and ethylene carbonate. These organic solvents can be employed alone or in combination when used together with water.

Of the above water-soluble organic solvents, diethylene glycol, thiodiethanol, polyethylene glycol (200) to (600), triethylene glycol, glycerol, 1,2,6-hexanetriol, 1,2,4-butanetriol, 3-methylpentane-1,3,5-triol, 1,5-pentanediol, and N-methyl-2-pyrrolidone are preferable because the solubility of the compound of formula (I) in the ink composition can be increased, and the decline of the ink-ejecting characteristics, which results from the evaporation of a water component, can be effectively prevented.

The aqueous ink composition according to the present invention may further comprise a penetrating agent besides the compound of formula (I) for adjusting the surface tension of the ink composition. Examples of the penetrating agent include alkyl ethers or aryl ethers derived from polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; fluorine-containing surface active agents; and lower alcohols such as ethanol, and 2-propanol. Of the above penetrating agents, diethylene glycol monobutyl ether is preferred in the present invention.

The surface tension of the aqueous ink composition is considered as a reliable indication of the wettability of the image-receiving medium by the ink composition. In the present invention, the surface tension does not mean the static surface tension measured at the equilibrium time, but the dynamic surface tension of a droplet of the ink composition measured within a relatively short period of time of one second or less after the formation of the droplet on the image-receiving medium. The above-mentioned dynamic surface tension of the aqueous ink composition, which may be measured by any conventional methods described in Japanese Laid-Open Patent Application 63-31237, is obtained by use of the Wilhelmy's surface balance in the present invention. The surface tension of a droplet of the aqueous ink composition according to the present invention is preferably 50 mJ/m$^2$ or less, more preferably 40 mJ/m$^2$ or less, from the viewpoint of excellent drying characteristics.

The aqueous ink composition of the present invention comprises a coloring agent such as a water-soluble dye or pigment. The water-soluble dyes for use in the present invention, which are divided into the following groups in accordance with the color index number, an acid dye, a direct dye, a basic dye, a reactive dye and a food dye, have water-resistance and light-resistance.

Specific examples of the acid dye and the food dye are as follows:
C.I. Acid Yellow 17, 23, 42, 44, 79, 142;
C.I. Acid Red 1, 8, 13, 14, 18, 26, 27, 35, 37, 42, 52, 82, 87, 89, 92, 97, 106, 111, 114, 115, 134, 186, 249, 254, 289;
C.I. Acid Blue 9, 29, 45, 92, 249;
C.I. Acid Black 1, 2, 7, 24, 26, 94;
C.I. Food Yellow 3, 4;
C.I. Food Red 7, 9, 14; and
C.I. Food Black 1, 2.

Specific examples of the direct dye are as follows:
C.I. Direct Yellow 1, 12, 24, 26, 33, 44, 50, 86, 120, 132, 142, 144;
C.I. Direct Red 1, 4, 9, 13, 17, 20, 28, 31, 39, 80, 81, 83, 89, 225, 227;
C.I. Direct Orange 26, 29, 62, 102;
C.I. Direct Blue 1, 2, 6, 15, 22, 25, 71, 76, 79, 86, 87, 90, 98, 163, 165, 199, 202; and
C.I. Direct Black 19, 22, 32, 38, 51, 56, 71, 74, 75, 77, 154, 168, 171.

Specific examples of the basic dye are as follows:
C.I. Basic Yellow 1, 2, 11, 13, 14, 15, 19, 21, 23, 24, 25, 28, 29, 32, 36, 40, 41, 45, 49, 51, 53, 63, 65, 67, 70, 73, 77, 87, 91;
C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;
C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and
C.I. Basic Black 2, 8.

Specific examples of the reactive dye are as follows:
C.I. Reactive Black 3, 4, 7, 11, 12, 17;
C.I. Reactive Yellow 1, 5, 11, 13, 14, 20, 21, 22, 25, 40, 47, 51, 55, 65, 67;
C.I. Reactive Red 1, 14, 17, 25, 26, 32, 37, 44, 46, 55, 60, 66, 74, 79, 96, 97; and
C.I. Reactive Blue 1, 2, 7, 14, 15, 23, 32, 35, 38, 41, 63, 80, 95.

Of these dyes, the acid dyes and the direct dyes are preferably employed in the present invention.

Examples of the pigment serving as the coloring agent in the aqueous ink composition of the present invention are organic pigments such as azo pigments, phthalocyanine pigments, anthraquinone pigments, quinacridone pigments, dioxazine pigments, indigo pigments, thioindigo pigments, perylene pigments, isoindolenone pigments, Aniline Black, azomethine pigments, Rhodamine B lake pigments, and carbon black; and inorganic pigments such as iron oxide, titanium oxide, calcium carbonate, barium sulfate, aluminum hydroxide, barium yellow, prussian blue, cadmium red, chrome yellow, and metal powder.

Examples of the pigment dispersant for use in the ink composition of the present invention are natural hydrophobic polymers, for example, vegetable polymers such as gum arabic, tragacanth gum, guar gum, karaya gum, locust bean gum, arabinogalactan, pectin, and quince seed starch; seaweed polymers such as alginic acid, carrageenan, and agar; animal polymers such as gelatin, casein, albumin, collagen and shellac; microbial polymers such as xanthene, and dextran; semisynthetic hydrophobic polymers, for example, cellulose polymers such as methyl cellulose, ethyl cellulose, hydroxyethyl cellulose, hydroxypropyl cellulose, and carboxymethyl cellulose; starch polymers such as starch sodium glycolate, and starch sodium phosphorate; seaweed-based polymers such as sodium alginate, and propyleneglycol alginate; and synthetic hydrophobic polymers, for example, vinyl polymers such as polyvinyl alcohol, polyvinyl pyrrolidone, and polyvinyl methyl ether; non-crosslinked polyacrylamide; polyacrylic acid, and alkaline metal salts thereof; acrylic resin such as water-soluble styrene-acrylic resin; water-soluble styrene-maleic acid resin; water-soluble vinylnaphthalene-acrylic resin;

water-soluble vinylnaphthalene-maleic acid resin; polyvinyl pyrrolidone; polyvinyl alcohol; an alkaline metal salt of a condensation product of formalin and β-naphthalenesulfonic acid; and polymeric compounds having a side chain with a salt of a cationic functional group such as quaternary ammonium or amino group.

In addition to the above-mentioned coloring agent and solvent, the aqueous ink composition of the present invention may further comprise conventionally known additives such as an antiseptic agent, a mildewproofing agent, a pH adjustor, a chelate reagent, and a corrosion inhibitor.

For instance, sodium dehydroacetate, sodium sorbate, sodium 2-pyridinethiol-1-oxide, sodium benzoate, and sodium pentachlorophenol can be employed as the antiseptic agents and mildewproofing agents.

Any materials which have no adverse effect on the obtained ink composition, and by which the aqueous ink composition can be adjusted to pH 6 or more can freely be employed as the pH adjustors in the present invention. Examples of the pH adjustor for use in the present invention are amines such as diethanolamine and triethanolamine; hydroxides of alkaline metals such as lithium hydroxide, sodium hydroxide and potassium hydroxide; other hydroxides such as ammonium hydroxide, quaternary ammonium hydroxide and quaternary phosphonium hydroxide; and carbonates of alkaline metals such as lithium carbonate, sodium carbonate, and potassium carbonate.

Examples of the chelate reagent for use in the aqueous ink composition of the present invention include sodium ethylene diamine tetraacetate, sodium nitrilotriacetate, sodium hydroxyethyl ethylene diamine triacetate, sodium diethylene triamine pentaacetate, and sodium uramil diacetate.

Examples of the corrosion inhibitor are acid sulfite, sodium thiosulfate, ammon thiodiglycollic acid, diisopropyl ammonium nitrite, pentaerythritol tetranitrate, and dicyclohexyl ammonium nitrite.

Furthermore, the aqueous ink composition of the present invention may further comprise a water-soluble ultraviolet absorbing agent, a water-soluble infrared absorbing agent, and a surface active agent according to the application thereof.

Since most of the copy paper and the letter paper for office use have a pH of 5 to 6, it is preferable that the pH of the aqueous ink composition according to the present invention be 6 or more from the viewpoint of preservation stability of thee ink composition.

According to the present invention, a method of recording color images on an image-receiving medium can be provided by using the above-mentioned aqueous ink composition. More specifically, the method of recording color images on an image-receiving medium according to the present invention comprises the step of ejecting an aqueous ink composition in the form of droplets from nozzles onto an image-receiving medium with a St0ckigt sizing degree of 3 seconds or more as defined in the JIS-P-8122, the aqueous ink composition comprising water, a lubricant, a coloring agent dispersed or dissolved in water, and a compound represented by formula (I):

$$R—O(CH_2CH_2O)_mCH_2COOM \quad (I)$$

wherein R is an alkyl group having 6 to 14 carbon atoms which may be branched; M is a cation selected from the group consisting of alkali metal ion, quaternary ammonium cation, quaternary phosphonium cation, and alkanol amine cation; and m is an integer of 3 to 12.

In the recording method of the present invention, it is preferable that the diameter of the nozzle from which the ink composition is ejected be in the range from 30 to 60 μm. In addition, it is desirable that the weight of each ink droplet ejected from the nozzle be adjusted to in the range from 30 to 150 ng, and the ink droplets be ejected from the nozzle toward the image-receiving medium at a speed of 6 to 20 m/s. By the recording method of the present invention, images with high quality and high resolution can be obtained on the image-receiving medium.

Other features of this invention will become apparent in the course of the following description of exemplary embodiments, which are given for illustration of the invention and are not intended to be limiting thereof.

EXAMPLE 1

A mixture of the following components was stirred and dissolved at 60° C.:

|  | wt. % |
| --- | --- |
| C.I. Acid Yellow 23 | 1.2 |
| Glycerol | 5 |
| Diethylene glycol | 5 |
| Compound (I-2-A) | 0.8 |
| Sodium dehydroacetate | 0.2 |
| Ion-exchange water | 87.8 |

The above mixture was cooled to room temperature and the pH of the mixture was adjusted to 8 by the addition of 10% aqueous solution of lithium hydroxide. The thus obtained mixture was filtered through a Teflon filter, so that an aqueous ink composition No. 1 (yellow) according to the present invention was obtained.

EXAMPLE 2

A mixture of the following components was stirred and dissolved at 60° C.:

|  | wt. % |
| --- | --- |
| C.I. Acid Red 254 | 1.5 |
| 1,2,6-hexanetriol | 8 |
| 1,5-pentanediol | 8 |
| Compound (I-2-B) | 1.2 |
| 25% aqueous solution of a hydroxide (II-1-A) | 0.8 |
| Sodium 2-pyridinethiol-1-oxide | 0.2 |
| Ion-exchange water | 80.3 |

The above mixture was cooled to room temperature and the pH of the mixture was adjusted to 9 by the addition of 10% aqueous solution of sodium hydroxide. The thus obtained mixture was filtered through a Teflon filter, so that an aqueous ink composition No. 2 (magenta) according to the present invention was obtained.

EXAMPLE 3

A mixture of the following components was stirred and dissolved at 60° C.:

|  | wt. % |
| --- | --- |
| C.I. Acid Blue 249 | 1.9 |

|  | wt. % |
|---|---|
| N-methyl-2-pyrrolidone | 5 |
| Glycerol | 2 |
| Propylene glycol monobutyl ether | 2 |
| Compound (I-2-C) | 0.5 |
| 25% aqueous solution of a hydroxide (II-1-C) | 0.2 |
| Sodium dehydroacetate | 0.2 |
| Ion-exchange water | 88.2 |

The above mixture was cooled to room temperature and the pH of the mixture was adjusted to 9 by the addition of 10% aqueous solution of lithium hydroxide. The thus obtained mixture was filtered through a Teflon filter, so that an aqueous ink composition No. 3 (cyan) according to the present invention was obtained.

EXAMPLE 4

A mixture of the following components was stirred and dissolved at 60° C.:

|  | wt. % |
|---|---|
| C.I. Food Black 2 | 3.2 |
| Ethylene glycol | 5 |
| Glycerol | 2 |
| 1,5-pentanediol | 10 |
| Compound (I-2-D) | 0.8 |
| 25% aqueous solution of a hydroxide (II-1-D) | 2 |
| Sodium benzoate | 0.2 |
| Ion-exchange water | 76.8 |

The above mixture was cooled to room temperature and the pH of the mixture was adjusted to 9 by the addition of 10% aqueous solution of lithium hydroxide. The thus obtained mixture was filtered through a Teflon filter, so that an aqueous ink composition No. 4 (black) according to the present invention was obtained.

EXAMPLE 5

A mixture of the following components was stirred and dissolved at 60° C.:

|  | wt. % |
|---|---|
| C.I. Direct Yellow 120 | 1 |
| Triethylene glycol | 5 |
| 3-methylpentane-1,3,5-triol | 10 |
| Compound (I-2-J) | 2 |
| 25% aqueous solution of a hydroxide (II-1-B) | 1.5 |
| Ion-exchange water | 80.5 |

The above mixture was cooled to room temperature and the pH of the mixture was adjusted to 9 by the addition of 10% aqueous solution of sodium hydroxide. The thus obtained mixture was filtered through a Teflon filter, so that an aqueous ink composition No. 5 (yellow) according to the present invention was obtained.

EXAMPLE 6

A mixture of the following components was stirred and dissolved at 60° C.:

|  | wt. % |
|---|---|
| C.I. Direct Red 9 | 1.5 |
| Propylene glycol | 8 |
| Glycerol | 7 |
| Compound (I-2-I) | 1 |
| 25% aqueous solution of a hydroxide (II-2-A) | 2 |
| Ion-exchange water | 80.5 |

The above mixture was cooled to room temperature and the pH of the mixture was adjusted to 8 by the addition of 10% aqueous solution of lithium hydroxide. The thus obtained mixture was filtered through a Teflon filter, so that an aqueous ink composition No. 6 (magenta) according to the present invention was obtained.

EXAMPLE 7

A mixture of the following components was stirred and dissolved at 60° C.:

|  | wt. % |
|---|---|
| C.I. Direct Blue 199 | 1.8 |
| N-methyl-2-pyrrolidone | 8 |
| 1,5-pentanediol | 8 |
| Compound (I-2-A) | 0.8 |
| Sodium benzoate | 0.1 |
| Ion-exchange water | 81.3 |

The above mixture was cooled to room temperature and the pH of the mixture was adjusted to 9 by the addition of 10% aqueous solution of lithium hydroxide. The thus obtained mixture was filtered through a Teflon filter, so that an aqueous ink composition No. 7 (cyan) according to the present invention was obtained.

EXAMPLE 8

A mixture of the following components was stirred and dissolved at 60° C.:

|  | wt. % |
|---|---|
| C.I. Direct Black 168 | 2.8 |
| Thiodiethanol | 5 |
| Glycerol | 10 |
| Compound (I-2-G) | 1.5 |
| Benzoic acid | 0.1 |
| Ion-exchange water | 80.6 |

The above mixture was cooled to room temperature and the pH of the mixture was adjusted to 8 by the addition of 10% aqueous solution of sodium hydroxide. The thus obtained mixture was filtered through a Teflon filter, so that an aqueous ink composition No. 8 (black) according to the present invention was obtained.

EXAMPLE 9

The procedure for the preparation of the aqueous ink composition No. 8 of the present invention in Example 8 was repeated except that the compound (I-2-G) in the formulation for the aqueous ink composition No. 8 in Example 8 was replaced by the commercially available surface active agent "ECTD-3NEX" (Trademark), made by Nikko Chemicals Co., Ltd., so that an aqueous ink composition No. 9 (black) according to the present invention was obtained.

Comparative Example 1

The procedure for the preparation of the aqueous ink composition No. 1 of the present invention in Example 1 was repeated except that the compound (I-2-A) in the formulation for the aqueous ink composition No. 1 in Example 1 was not employed, so that a comparative aqueous ink composition No. 1 (yellow) was obtained.

Comparative Example 2

The procedure for the preparation of the aqueous ink composition No. 2 of the present invention in Example 2 was repeated except that the compound (I-2-B) in the formulation for the aqueous ink composition No. 2 in Example 2 was replaced by sodium di(2-ethylhexyl)sulfosuccinate, so that a comparative aqueous ink composition No. 2 (magenta) was obtained.

Comparative Example 3

The procedure for the preparation of the aqueous ink composition No. 3 of the present invention in Example 3 was repeated except that the compound (I-2-C) in the formulation for the aqueous ink composition No. 3 in Example 3 was replaced by dodecylbenzenesulfonic acid, so that a comparative aqueous ink composition No. 3 (cyan) was obtained.

Comparative Example 4

The procedure for the preparation of the aqueous ink composition No. 5 of the present invention in Example 5 was repeated except that the compound (I-2-J) in the formulation for the aqueous ink composition No. 5 in Example 5 was replaced by the commercially available nonionic surface active agent "BT7" (Trademark), made by Nikko Chemicals Co., Ltd., so that a comparative aqueous ink composition No. 4 (yellow) was obtained.

Comparative Example 5

The procedure for the preparation of the aqueous ink composition No. 7 of the present invention in Example 7 was repeated except that the compound (I-2-A) in the formulation for the aqueous ink composition No. 7 in Example 7 was replaced by dodecylsulfuric acid, so that a comparative aqueous ink composition No. 5 (cyan) was obtained.

Comparative Example 6

The procedure for the preparation of the aqueous ink composition No. 8 of the present invention in Example 8 was repeated except that the compound (I-2-G) in the formulation for the aqueous ink composition No. 8 in Example 8 was replaced by the commercially available nonionic surface active agent with an acetylene bonding "Surfynol 465" (Trademark), made by Air Products & Chemicals Inc., so that a comparative aqueous ink composition No. 6 (black) was obtained.

Using each of the above prepared aqueous ink compositions No. 1 to No. 9 according to the present invention and comparative aqueous ink compositions No. 1 to No. 6, the tests were conducted to evaluate the following items:

(1) Image quality

Figure 2:
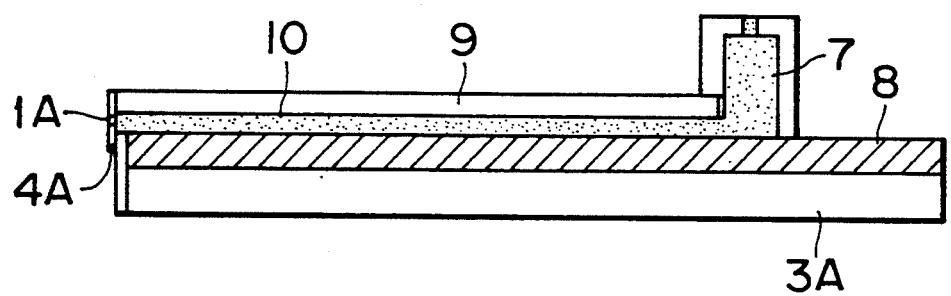
FIG. 2 is a schematic view of another embodiment which shows the structure of an ink-jet printer for use with an aqueous ink composition according to the present invention.

Each aqueous ink composition was separately filled into a thermal ink-jet printer as shown in FIG. 1, and an ink-jet printer capable of ejecting the ink composition therefrom by the application of pressure thereto, as shown in FIG. 2.

In the ink-jet printer as shown in FIG. 1, the ink composition was supplied to an ink container 5 through an ink-supplying pipe 6 from an ink tank (not shown). In the ink container 5, the thermal energy was applied to the ink composition by a heating element 2 in accordance with the image signals, so that the ink composition in the form of a film on the heating element 2 was caused to boil and the ink composition in the form of droplets was ejected from a nozzle 1. The ink container 5 was held by a support 3 capable of supporting the heating elements 2 thereon; and a nozzle-supporting plate 4 on which a plurality of nozzles 1 were provided.

In the ink-jet printer as shown in FIG. 2, the ink composition was separately supplied from a main ink container 7 to a plurality of ink containers, each having its own nozzle 1A provided on a nozzle-supporting plate 4A. Each ink container corresponded to a flow path 10, which was held by a flow path plate 9 and a support 3A capable of supporting a laminated material of PZT 8. The ink composition was ejected from each nozzle 1A by the application of pressure thereto, utilizing the action of a piezoelectric element of PZT of the laminated material 8.

In this test, printing was conducted on three kinds of paper, that is, reclaimed paper, high quality paper, and bond paper, and the image quality of the printed images was evaluated by visual inspection from the viewpoints of the image blurring, the blurring at the boundaries of a secondary color obtained by superimposing the two colored inks, the color tone and the image density.

The results are shown in Table 1.

(2) Drying characteristics of ink compositions

A sheet of filter paper was applied to the printed images under the predetermined conditions immediately after the images were printed on the above-mentioned three kinds of paper. The drying characteristics of the ink compositions were expressed by the time from forming the images on the papers until the ink was not transferred to the sheet of filter paper. In the case where the ink was not transferred to the sheet of filter paper within 10 seconds after the formation of images with respect to any of the three kinds of paper, the drying characteristics of the ink composition were regarded as excellent, indicating the mark "o" in Table 1.

(3) Preservation stability of ink compositions

Four samples of each ink composition were separately placed in a polyethylene container, and allowed to stand at −20° C., 5° C., 20° C. and 70° C. for three months. After the storage for three months, the presence or absence of a precipitate in each sample was visually inspected, and the changes in the physical properties such as the surface tension and viscosity were measured.

The results are shown in Table 1. Mark "o" denotes that no change in the physical properties was observed under any of the above-mentioned preservation temperature conditions.

(4) Reliability of ink-ejecting performance

Each ink composition was filled into the ink-jet printer with a printer head as shown in FIG. 2. The printing operation was continuously carried out without providing a cap for the printer head and conducting an operation for cleaning of the nozzles. The ink-ejecting reliability of each ink composition was expressed by the decap time (sec.), namely, the time from starting the printing operation with the nozzles being decapped until the direction in which the ink composition was ejected from one of the decapped nozzles was deviated from its original direction. The results are shown in Table 1.

TABLE 1

| | Image Quality | Drying Characteristics of Images | Preservation Stability of Ink | Decap Time (sec.) |
|---|---|---|---|---|
| Ex. 1 | o | o | o | 600 or more |
| Ex. 2 | o | o | o | 600 or more |
| Ex. 3 | o | o | o | 500 |
| Ex. 4 | o | o | o | 550 |
| Ex. 5 | o | o | o | 500 |
| Ex. 6 | o | o | o | 400 |
| Ex. 7 | o | o | o | 400 |
| Ex. 8 | o | o | o | 500 |
| Ex. 9 | o | o | o | 500 |
| Comp. Ex. 1 | o | o | o | 600 or more |
| Comp. Ex. 2 | o | x | (Note 1) | 450 |
| Comp. Ex. 3 | o | o | (Note 1) | 400 |
| Comp. Ex. 4 | x | x | o | 500 |
| Comp. Ex. 5 | o | o | (Note 1) | 200 |
| Comp. Ex. 6 | o | x | o | 500 |

(Note 1): A precipitate was observed in any sample of the ink composition.

According to the present invention, there is provided an aqueous ink composition which can satisfy the requirements for an ink composition for use with the ink-jet printing method. More specifically, the wettability of the image-receiving sheet by the ink composition is improved, and the drying characteristics of the ink are excellent because the aqueous ink composition of the present invention comprises the compound represented by formula (I). The deterioration in image quality of the images obtained by use of the aqueous ink composition of the present invention can be reduced.

Furthermore, when the compound of formula (I) contained in the ink composition of the present invention comprises a cation as previously specified, the preservation stability at low temperatures, and the ink-ejecting stability of the obtained aqueous ink composition are improved.

In addition, when the pH of the aqueous ink composition of the present invention is adjusted to 6 or more, the ink-ejecting performance can be made stable even after the intermission of the printing operation over a long period of time, and during the continuous printing operation.

According to the ink-jet printing method of the present invention, the wettability of any of the image-receiving sheets such as a sheet of plain paper or coated paper for use in ink-jet printing by the ink composition is improved, and the penetrating speed of the ink composition through the paper is increased, so that high quality color images can be stably formed on any of the image-receiving sheets without image blurring.

What is claimed is:

1. An aqueous ink composition comprising water, a lubricant, a coloring agent dispersed or dissolved in water, and a compound of formula (I):

R—O(CH$_2$CH$_2$O)$_m$CH$_2$COOM    (I)

wherein R is an alkyl group having 6 to 14 carbon atoms; M is a cation selected from the group consisting of alkali metal ion, quaternary ammonium cation, quaternary phosphonium cation, and alkanol amine cation; and m is an integer of 3 to 12, where compound (I) is present in the ink composition in amount to decrease the surface tension of the ink to 50 mJ/m$^2$ or less.

2. The aqueous ink composition as claimed in claim 1, wherein said alkali metal ion is selected from the group consisting of sodium cation and lithium cation.

3. The aqueous ink composition as claimed in claim 1, wherein said quaternary ammonium cation is represented by formula (II-1):

(II-1)

wherein R$^1$, R$^2$, R$^3$, and R$^4$ each is selected from the group consisting of an alkyl group having 1 to 6 carbon atoms, a hydroxyalkyl group having 1 to 6 carbon atoms, and a halogenated alkyl group having 1 to 4 carbon atoms.

4. The aqueous ink composition as claimed in claim 1, wherein said quaternary phosphonium cation is represented by formula (II-2):

(II-2)

wherein R$^1$, R$^2$, R$^3$, and R$^4$ each is selected from the group consisting of an alkyl group having 1 to 6 carbon atoms, a hydroxyalkyl group having 1 to 6 carbon atoms, and a halogenated alkyl group having 1 to 4 carbon atoms.

5. The aqueous ink composition as claimed in claim 1, wherein said alkanol amine cation is represented by formula (II-3):

(II-3)

wherein at most three of R$^1$, R$^2$, R$^3$, or R$^4$ is hydrogen, and the remainder is a hydroxyalkyl group having 1 to 6 carbon atoms.

6. An aqueous ink composition comprising water, a lubricant, a coloring agent dispersed or dissolved in water, an anion of formula (I-1):

R—O(CH$_2$CH$_2$O)$_m$CH$_2$COO$^-$    (I-1)

wherein R is an alkyl group having 6 to 14 carbon atoms, and m is an integer of 3 to 12; at least one counter cation selected from the group consisting of alkali metal ion, quaternary ammonium cation, quaternary phosphonium cation, and alkanol amine cation; and a compound of formula (I-2):

R—O(CH$_2$CH$_2$O)$_m$CH$_2$COOH    (I-2)

wherein R is an alkyl group having 6 to 14 carbon atoms, and m is an integer of 3 to 12, said ink composition having a pH of 6 or more, where anion (I-1) and its counter cation and compound (I-2) are present in the ink composition in amount to decrease the surface tension of the ink to 50 mJ/m² or less.

7. The aqueous ink composition as claimed in claim 6, wherein said alkali metal ion is selected from the group consisting of sodium cation and lithium cation.

8. The aqueous ink composition as claimed in claim 6, wherein said quaternary ammonium cation is represented by formula (II-1):

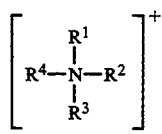

(II-1)

wherein $R^1$, $R^2$, $R^3$, and $R^4$ each is selected from the group consisting of an alkyl group having 1 to 6 carbon atoms, a hydroxyalkyl group having 1 to 6 carbon atoms, and a halogenated alkyl group having 1 to 4 carbon atoms.

9. The aqueous ink composition as claimed in claim 6, wherein said quaternary phosphonium cation is represented by formula (II-2):

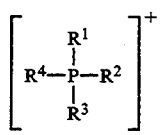

(II-2)

wherein $R^1$, $R^2$, $R^3$, and $R^4$ each is selected from the group consisting of an alkyl group having 1 to 6 carbon atoms, a hydroxyalkyl group having 1 to 6 carbon atoms, and a halogenated alkyl group having 1 to 4 carbon atoms.

10. The aqueous ink composition as claimed in claim 6, wherein said alkanol amine cation is represented by formula (II-3):

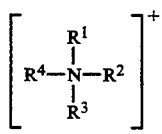

(II-3)

wherein at most three of $R^1$, $R^2$, $R^3$, or $R^4$ is hydrogen, and the remainder is a hydroxyalkyl group having 1 to 6 carbon atoms.

11. A method of recording color images on an image-receiving medium, comprising the step of ejecting an aqueous ink composition in the form of droplets from nozzles onto an image-receiving medium with a Stöckigt size degree of 3 seconds or more as defined in the Japanese Industrial Standards P-8122, said aqueous ink composition comprising water, a lubricant, a coloring agent dispersed or dissolved in water, and a compound of formula (I):

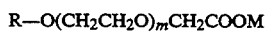

R—O(CH₂CH₂O)ₘCH₂COOM    (I)

wherein R is an alkyl group having 6 to 14 carbon atoms; M is a cation selected from the group consisting of alkali metal ion, quaternary ammonium cation, quaternary phosphonium cation, and alkanol amine cation; and m is an integer of 3 to 12, where compound (I) is present in the ink composition in amount to decrease the surface tension of the ink to 50 mJ/m² or less.

12. The method of recording color images as claimed in claim 11, wherein said alkali metal ion is selected from the group consisting of sodium cation and lithium cation.

13. The method of recording color images as claimed in claim 11, wherein said quaternary ammonium cation is represented by formula (II-1):

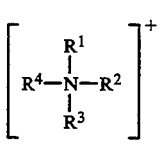

(II-1)

wherein $R^1$, $R^2$, $R^3$, and $R^4$ each is selected from the group consisting of an alkyl group having 1 to 6 carbon atoms, a hydroxyalkyl group having 1 to 6 carbon atoms, and a halogenated alkyl group having 1 to 4 carbon atoms.

14. The method of recording color images as claimed in claim 11, wherein said quaternary phosphonium cation is represented by formula (II-2):

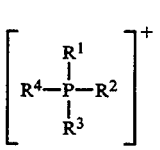

(II-2)

wherein $R^1$, $R^2$, $R^3$, and $R^4$ each is selected from the group consisting of an alkyl group having 1 to 6 carbon atoms, a hydroxyalkyl group having 1 to 6 carbon atoms, and a halogenated alkyl group having 1 to 4 carbon atoms.

15. The method of recording color images as claimed in claim 11, wherein said alkanol amine cation is represented by formula (II-3):

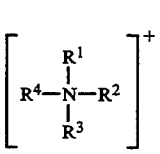

(II-3)

wherein at most three of $R^1$, $R^2$, $R^3$, or $R^4$ is hydrogen, and the remainder is a hydroxyalkyl group having 1 to 6 carbon atoms.

16. A method of recording color images on an image-receiving medium, comprising the step of ejecting an aqueous ink composition in the form of droplets from nozzles onto an image-receiving medium with a Stöckigt size degree of 3 seconds or more as defined in the Japanese Industrial Standards P-8122, said aqueous ink composition comprising water, a lubricant, a coloring agent dispersed or dissolved in water, an anion of formula (I-1):

R—O(C₂CH₂O)ₘCH₂COO⁻    (I-1)

wherein R is an alkyl group having 6 to 14 carbon atoms, and m is an integer of 3 to 12; at least one counter cation selected from the group consisting of alkali metal ion, quaternary ammonium cation, quaternary phosphonium cation, and alkanol amine cation; and a compound of formula (I-2)

$$R-O(CH_2CH_2O)_mCH_2COOH \qquad (I-2)$$

wherein R is an alkyl group having 6 to 14 carbon atoms, and m is an integer of 3 to 12, where anion (I-1) and its counter cation and compound (I-2) are present in the ink composition in amount to decrease the surface tension of the ink to 50 mJ/m² or less.

17. An aqueous ink composition comprising water, a lubricant, a coloring agent dispersed or dissolved in water, and a compound of formula (I):

$$R-O(CH_2CH_2O)_mCH_2COOM \qquad (I)$$

wherein R is an alkyl group having 6 to 14 carbon atoms; M is a cation selected from the group consisting of alkali metal ion, quaternary ammonium cation, quaternary phosphonium cation, and alkanol amine cation; and m is an integer of 3 to 12, the amount of the compound of formula (I) in the ink composition being 0.05 to 10 wt. % of the weight of the ink composition.

18. An aqueous ink composition comprising water, a lubricant, a coloring agent dispersed or dissolved in water, an anion of formula (I-1):

$$R-O(CH_2CH_2O)_mCH_2COO^- \qquad (I-1)$$

wherein R is an alkyl group having 6 to 14 carbon atoms, and m is an integer of 3 to 12; at least one counter cation selected from the group consisting of alkali metal ion, quaternary ammonium cation, quaternary phosphonium cation, and alkanol amine cation; and a compound of formula (I-2):

$$R-O(CH_2CH_2O)_mCH_2COOH \qquad (I-2)$$

wherein R is an alkyl group having 6 to 14 carbon atoms, and m is an integer of 3 to 12, said ink composition having a pH of 6 or more, the amount of anion (I-1) present in the aqueous ink composition being at least 30% of the number of mols of the salt of compound (I-1) and its counter cation, the salt being of formula (I) and being present in amount which is 0.05 to 10 wt. % of the weight of the ink composition, where formula (I) is $$R-O(CH_2CH_2-O)_mCH_2OOM$$

and M is said counter cation.

* * * * *

UNITED STATES PATENT AND TRADEMARK OFFICE
CERTIFICATE OF CORRECTION

PATENT NO. : 5,431,720
DATED : JULY 11, 1995
INVENTOR(S) : NAGAI, ET AL.

It is certified that error appears in the above-identified patent and that said Letters Patent is hereby corrected as shown below:

On the title page, item [57], line 1, "ASn" should read --An--.

Column 1, line 17, "utilized" should read --utilized in--.

Column 9, line 58, "StOckigt" should read --Stoeckigt--.

Column 14, line 64, "Was" should read --was--.

Signed and Sealed this

Third Day of September, 1996

*Attest:*

BRUCE LEHMAN

*Attesting Officer*    *Commissioner of Patents and Trademarks*